A. G. ANDERSON.
BUNCH HOLDING DEVICE FOR HOSE SUPPORTERS.
APPLICATION FILED SEPT. 9, 1921.

1,401,099.  Patented Dec. 20, 1921.

Inventor
Anders Gunnar Anderson
by his Attorneys
Baldwin & Wight

UNITED STATES PATENT OFFICE.

ANDERS G. ANDERSON, OF STONEHAM, MASSACHUSETTS.

BUNCH-HOLDING DEVICE FOR HOSE-SUPPORTERS.

1,401,099.     Specification of Letters Patent.     Patented Dec. 20, 1921.

Application filed September 9, 1921. Serial No. 499,414.

*To all whom it may concern:*

Be it known that I, ANDERS G. ANDERSON, a citizen of the United States, residing at Stoneham, in the county of Middlesex and State of Massachusetts, have invented certain new and useful Improvements in Bunch-Holding Devices for Hose-Supporters, of which the following is a specification.

This invention relates to devices for holding bunches of hose supporters for display purposes.

Heretofore it has been customary to attach bunches of hose supporters to split rings and to attach these rings, carrying the hose supporters, to suitable stands or to suitably supported display cards.

The split rings heretofore used have, however, not been entirely satisfactory owing to the fact that it was not easy to connect the pins of the hose supporters to the rings or to disconnect them therefrom or to connect the rings with their supports.

According to my invention I provide an improved bunch-holding device which is simple in construction and so made that bunches of hose supporters may be easily connected to it, and the device thus connected with the supporters may be readily applied to a suitable display stand or card.

In carrying out my invention I make the device of a single piece of wire bent into such shape as to provide a lower portion to which the hose supporters are connected, and an upper portion formed into a hook to enable the device to be easily connected to a suitable stand, display card or other suitable support. In the lower part of the device there is an open space bounded on the bottom by a horizontal pin-holding member and sides which close the space at opposite ends. One of the side members is continued and formed into a loop which closes the space at the top and is then prolonged to form a hook. The other side member is free and its upper end is curved and is arranged close to the loop. By this construction the opening into the bottom space is normally closed but the free side member may be moved away from the loop so as to open the device to receive the pins of the supporters. The opening of the device in this way may be performed when the pins are made to engage the free arm of the device.

In the accompanying drawings—

Figure 1:
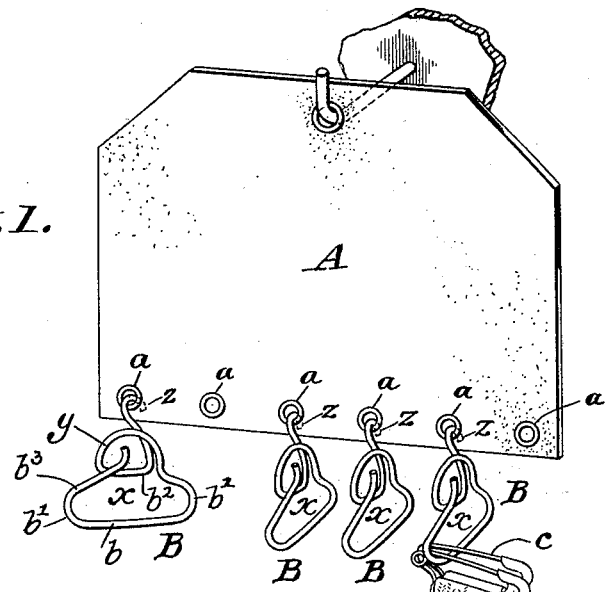
Figure 1 is a perspective view of a display card, carrying a number of bunch-holding devices, and it also shows how hose supporters may be connected with the supporting device.

In Fig. 1 I have shown a display card A having eyelet holes $a$ along its lower edge. A series of bunch-holding devices B is supported by the card and each of these devices is for the purpose of holding a plurality or bunch of hose supporters C. The drawings show a single pair of hose supporters connected with one of the devices B, but each device may support a larger number. It will be observed that the lower member of the bunch-holding device is connected with the safety pin $c$ of the hose supporter.

Each bunch-holding device is made from a single piece of wire. The lower portion of the device comprises a straight, horizontally arranged supporting member $b$, side members $b'$ and an upper member $b^2$. The members $b$, $b'$ and $b^2$ inclose a space $x$ adapted to receive the safety pins. One of the members $b'$ is prolonged and formed into a loop $y$ which includes the member $b^2$, and is then extended upwardly and formed into a hook $z$. The other member $b'$ has a free arm or finger $b^3$ formed with a curved top portion $b^4$ which overlies the side of the loop $y$.

The device thus constructed is adapted to receive and support a bunch of hose supporters. The pins $c$ can be easily slipped over the finger $b^3$ and then moved into the space $x$ and made to rest on the bottom member $b$. The pins cannot be accidentally separated from the device but can be withdrawn when desired.

Figure 2:
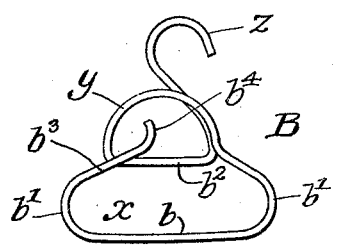
Fig. 2 is a front elevation of one form of bunch-holding device.
Figure 3:
Fig. 3 is a top plan view of the same.
Figure 4:
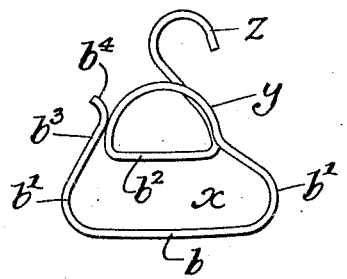
Fig. 4 is a side elevation of a bunch-holding device of slightly different construction.

The construction shown in Fig. 4 is the same as that shown in Figs. 1, 2 and 3 except that in this form of device the finger $b^3$ rests against the side of the loop $y$.

The devices herein shown and described while simple in construction have been found in actual practice to be most serviceable. While especially intended for use in supporting hose supporters, they may be used for other purposes.

I claim as my invention:—

1. A bunch-holding device for hose supporters made from a single length of wire, comprising at one end of said wire a lower bunch-holding member having a free spring arm, a hooked upper supporting member at the other end of said wire, and a loop in said wire intermediate its ends.

2. A supporting device for hose supporters and other articles made from a single length of wire, comprising at one end of said wire a lower holding member having one side permanently closed and the opposite side formed with a spring arm, a hooked upper supporting member at the other end of said wire, and a loop in said wire intermediate its ends.

3. A supporting device for hose supporters and other articles made from a single length of wire, comprising at one end of said wire a lower holding member having one side formed as a free spring arm, a hooked upper supporting member at the other end of said wire, and a loop in said wire intermediate its ends, the end of said spring arm lying adjacent said loop.

4. A supporting device for hose supporters and other articles made from a single piece of wire, comprising a lower holding member having one of its sides permanently closed and its opposite side formed as a spring arm, an upper hooked member, and an intermediate closed loop between the upper and lower members, the end of said spring arm lying adjacent said loop.

In testimony whereof, I have hereunto subscribed my name.

ANDERS G. ANDERSON.